(12) United States Patent
Munday

(10) Patent No.: US 9,487,134 B2
(45) Date of Patent: Nov. 8, 2016

(54) SEAT BACK ILLUMINATION MODULE

(71) Applicant: PANASONIC AVIONICS CORPORATION, Lake Forest, CA (US)

(72) Inventor: Kevin Munday, Tustin, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 0 days.

(21) Appl. No.: 14/638,316

(22) Filed: Mar. 4, 2015

(65) Prior Publication Data

US 2016/0257247 A1 Sep. 8, 2016

(51) Int. Cl.
*B60Q 3/02* (2006.01)
*B64D 11/00* (2006.01)

(52) U.S. Cl.
CPC ........... *B60Q 3/0223* (2013.01); *B60Q 3/0203* (2013.01); *B60Q 3/0253* (2013.01); *B60Q 3/0259* (2013.01); *B60Q 3/0266* (2013.01); *B60Q 3/0296* (2013.01); *B64D 11/00151* (2014.12); *B64D 2011/0053* (2013.01)

(58) Field of Classification Search
CPC  B60Q 3/0223; B60Q 3/0203; B60Q 3/0253; B60Q 3/0259; B60Q 3/0266; B60Q 3/0296
USPC .......................... 362/470, 471, 472, 488, 95
See application file for complete search history.

(56) References Cited

U.S. PATENT DOCUMENTS

| 7,909,490 B2 | 3/2011 | Chou et al. | |
| 8,929,082 B2 | 1/2015 | Mondragon et al. | |
| 2006/0092649 A1* | 5/2006 | Bynum | B60Q 3/0203 362/488 |
| 2012/0087142 A1* | 4/2012 | Schultheis | B60Q 3/0253 362/470 |
| 2014/0192544 A1* | 7/2014 | Orson | F21V 15/012 362/470 |

FOREIGN PATENT DOCUMENTS

EP          1 245 444 A1 * 10/2002

* cited by examiner

*Primary Examiner* — Laura Tso
(74) *Attorney, Agent, or Firm* — Stetina Brunda Garred & Brucker

(57) ABSTRACT

A seat back illumination module is provided having a housing defined by an interior and a partially open front face. A switch member with a first position and a second position at least partially protrudes from the front face of the housing and is engaged thereto. An illumination assembly is defined by an output end and has an illumination source. At least a part of the illumination assembly is mounted to the switch member, and the output end is proximal to a section of the switch member that protrudes from the front face of the housing. An electrical switch is connected to the illumination source and operated by movement of the switch member between the first position and the second position to selectively power the illumination source.

18 Claims, 10 Drawing Sheets

SEAT BACK ILLUMINATION MODULE

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to lighting devices, and more particularly, to illumination modules installable on seat backs of passenger vehicles.

2. Related Art

With most modes of passenger transport including air, rail, and road, the passengers are confined within an enclosed space of the vehicle for the entire duration of the journey. Thus, even the shortest trips leave the passenger with some idle time, which the passenger may occupy with work, leisure, and/or rest. As travel takes place at all hours of the day, sunlight that reaches the interior of the vehicle may be too limited or non-existent for some of these activities. Furthermore, safe movement within the vehicle by both passengers and operator personnel alike may be affected without adequate illumination.

Accordingly, passenger vehicles incorporate a variety of interior lighting features that meet safety and convenience needs. Emergency lighting may be installed along critical escape routes, while general lighting comprised of strategically positioned light fixtures that raise the ambient light level throughout the entirety of vehicle interior may be activated at most times. In order to foster a sense of calm and relaxation, softer lighting, in terms of color and intensity, may be utilized. In an attempt to balance the lighting needs of the aforementioned resting passengers on one hand, and the lighting needs of the active passengers on the other hand, the ambient light levels may be maintained at a sufficiently low level so as to not distract from sleep, while allowing wakeful activities such as reading, playing games, and so forth without much eye strain.

On most nighttime journeys or those journeys that extend into typical sleeping hours at the origin or the destination, general lighting is dimmed or switched off, leaving the interior of the vehicle darkened. Out of necessity or desire, a passenger may decide to remain awake notwithstanding the darkness and continue to read or engage in other activities that require more than a minimal level of illumination. To meet this need, many passenger vehicles, and in particular, mass transit vehicles such as aircraft, incorporate a reading light that shines a focused beam of light to the area occupied by the passenger.

In most passenger aircraft, the reading light is installed overhead in the ceiling of the cabin, underneath the passenger luggage storage compartments. One light is dedicated for each passenger seat, with its aim being preset thereto. In many conventional implementations, the light is not adjustable, though there have been some variations such as those with a ball-and-socket type mechanism and others that allow for multi-directional aiming. The reading light is typically controlled via a button on the armrest or other structure on the seat nearby the passenger. In some variations, the button may be incorporated into an input controller device that is used for interacting with an in-flight entertainment (IFE) system. On older aircraft, and on aircraft with lower interior ceilings, the button to activate and deactivate the overhead reading light may be positioned adjacent thereto.

Notwithstanding its ubiquity, overhead reading lights are deficient on several grounds. Because it is positioned overhead and is distant from the passenger, they remain visible to other passengers despite improvements in highly directional light focusing. Along these lines, despite efforts to limit the dispersion of the light beyond the immediate area of the passenger utilizing it, there still remains a degree of light encroachment upon neighboring passengers. Beyond the undesired impact to nearby passengers, conventional overhead reading lamps controlled by a button that is easily accessible require additional control lines, thereby increasing system complexity. On the other hand, without such controls, switching the light on and off is cumbersome at best. Moreover, overhead space is limited because of the countervailing demands for increased baggage storage space, so there are limitations with respect to the size and configuration of adjustment mechanisms and the like that could otherwise improve the user experience with the overhead reading lights.

Alternatives to overhead reading lamps in aircraft and other transport applications have been developed in response to these deficiencies. One such alternative is an adjustable light fixture that is positioned more closely to the passenger such as on the armrest, the headrest, or other structure of the aircraft that is not overhead. Earlier variations utilized flexible arm that is infinitely adjustable by the passenger. Another variation is disclosed in U.S. Pat. No. 7,909,490 to Chou et al., where an elongated housing enclosing a light pivots between an extended, deployed position and a retracted, stowed position. The apparatus can be mounted to a side of the seat or the head rest, extended over the shoulder of the passenger, and swiveled as desired. It is also possible to mount to the apparatus on the seat back. Although these reading lights have less of an impact on nearby passengers, they still involve a substantial physical interaction in stowage and deployment. The articulation and pivoting mechanisms can become degraded and loosened through extended usage, thereby limiting the capability to hold or maintain desired positions. Depending on the mounting position, these reading lights require twisting and reaching by the passenger, and do not represent a substantial improvement beyond conventional overhead reading lights, which can at least be activated with controls accessible nearby.

Thus, there is a need in the art for an improved illumination module that is installable on the seat backs of passenger vehicles, in particular, aircraft. There is also a need for illumination devices that are readily accessible by the passenger, and switched on and switched off with minimal effort within the confines of a passenger seat.

BRIEF SUMMARY

The present disclosure contemplates embodiments of a light jack or a light module that serve as reading lights in passenger vehicles. These modules may utilize enclosures that are similar in shape and size to other modules providing different functionality within the overall context of on-board entertainment units.

One embodiment is directed to an illumination module for mounting to a vehicle interior structure. The module may include a housing defined by an interior and a partially open front face. Additionally, the module may include a switch member that is engaged with the housing. The switch member is also contemplated to at least partially protrude from the front face thereof, and have a first position and a second position. There may also be an illumination assembly that is defined by an output end and includes an illumination source. At least a part of the illumination assembly may be mounted to the switch member. The output end may be proximal to a section of the switch member that protrudes from the front face of the housing. The module may also include an electrical switch that is connected to the illumination source and operated by movement of the switch member between the first position and the second position to selectively power the illumination source.

Another embodiment of the present disclosure is directed to a reading light for a passenger seat back. The reading light may include a base enclosure that can be mounted to the passenger seat back. Additionally, the reading light may include a switch actuator that is in a vertically rotating engagement with the base enclosure about a horizontal rotation axis. Furthermore, there may be a lamp unit that is mounted to the switch actuator in a first orientation to project light along an emission axis that is substantially normal to the horizontal rotation axis of the switch actuator. The projection of light may also extend rearward and away from the passenger seat back. The reading light may include an alternate push electrical switch that is coupled to the switch actuator and electrically connected to the lamp unit. Actuations of the alternate push electrical switch with the switch actuator may correspondingly activate and deactivate the lamp unit.

Yet another embodiment is directed to a lighting apparatus. There may be a pivot assembly that includes an illumination source projecting light outwardly from a pivot axis. The illumination source may also have a first illuminated state and a second deactivated state. The lighting apparatus may also have a switch that is connected to the pivot assembly and electrically tied to the illumination source. The pivot assembly may be transitioned between the first illuminated state and the second deactivated state in response to an actuation of the switch from an external force applied to the pivot assembly.

A further embodiment of the present disclosure is directed to an illumination module for mounting to an interior structure in a vehicle. The vehicle may have a panel with a plurality of openings into which at least one other kind of module is mountable in one of the openings. The illumination module may have a housing including an interior and an open front face. Additionally, there may be an illumination source that is disposed in the housing. There may also be a switch including first and second states. The switch may electrically connect the illumination source to an energy source when the switch is actuated to one state and electrically disconnecting the illumination source from the energy source when the switch is actuated to the other one of the first and second states. The illumination source may emit light through the open front face of the housing when connected to the energy source by the switch. The housing is insertable into another of the openings and into said one of the openings such that there is interchangeability with the other kind of module.

The present disclosure and the various embodiments set forth herein will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The present disclosure is directed to illumination modules that are configured for installation on seat backs of passenger vehicles. The detailed description set forth below in connection with the appended drawings is intended as a description of the presently preferred embodiments of the illumination module, and is not intended to represent the only form in which it can be developed or utilized. The description sets forth the features of the illumination module in connection with the illustrated embodiments. It is to be understood, however, that the same or equivalent functions may be accomplished by different embodiments that are also intended to be encompassed with the present disclosure. It is further understood that the use of relational terms such as first, second, distal, proximal, and the like are used solely to distinguish one from another entity without necessarily requiring or implying any actual such order or relationship between such entities.

Figure 1:
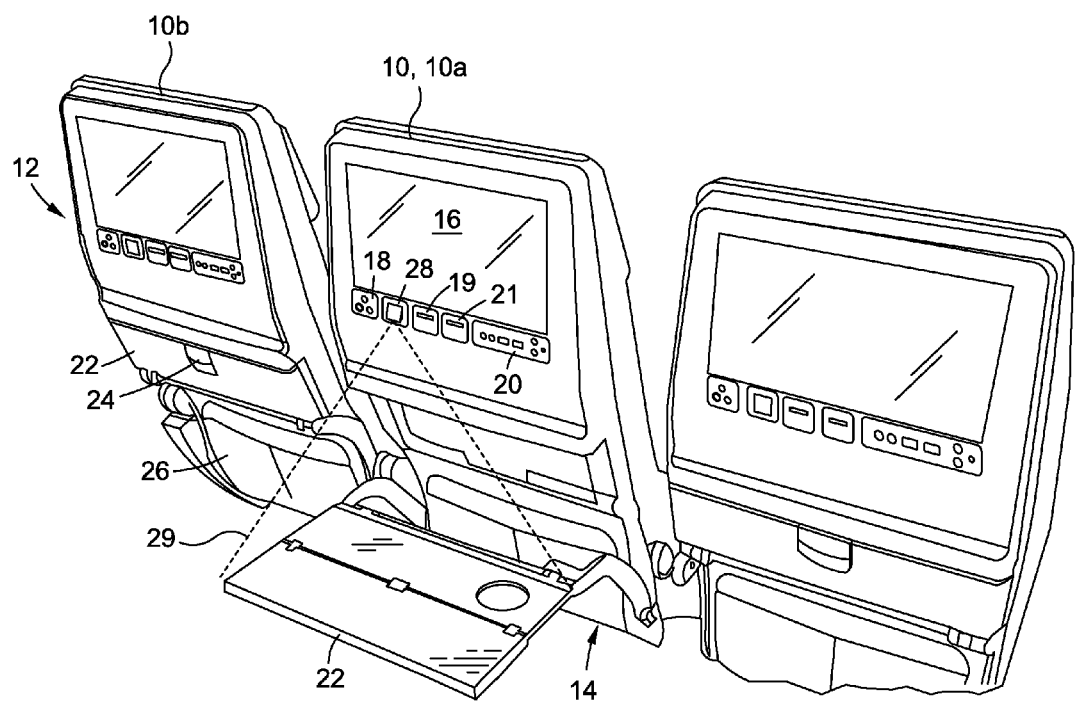
FIG. 1 is a perspective view of a row of passenger seats with each including an illumination module in accordance with one embodiment of the present disclosure.

The various embodiments of the presently disclosed illumination modules are contemplated for mounting on seat backs of aircraft, and one such exemplary installation is presented in FIG. 1. As illustrated, a series of passenger seats 10 are arranged in rows 12, with a typical aircraft configuration having multiple rows throughout the cabin. Although the features of the present disclosure will be described in the context of passenger aircraft and amenities therefor, it will be recognized by those having ordinary skill in the art that this is by way of example only and not of limitation. The illumination modules may be utilized in connection with other passenger vehicles such as trains, watercraft, busses, and others where there are passengers seated in multiple rows and the seat back of one row provides space for different on-board convenience and entertainment features.

The configuration of a seat back 14 of the passenger seat 10 is typical of modern aircraft where each passenger is provided with an in-flight entertainment (IFE) unit. The components on the seat back 14 are understood to be for the benefit of the passengers seated in the row behind the illustrated row 12, though such passenger seats have been omitted for the sake of clarity. With the middle passenger seat 10a as an example, the seat back 14 is understood to include a display screen 16 that may be used to present various television shows, news, and movie entertainment programs, flight status updates, advertisements, safety messages, and so on. Each passenger utilizes an individual headset that provides a more private listening experience, and may be connected via standard ring/tip/sleeve sockets included in an audio jack module 18 that is disposed in proximity to the display screen 16. The audio jack module 18 may be an active type with noise canceling and having three sockets as illustrated or a standard audio output without noise canceling. The latest in-flight entertainment systems are also capable of connecting the personal electronic devices of passengers such as music players, and mobile phones, so there is preferably at least one additional module 19 incorporating one or more Universal Serial Bus (USB) sockets. Another module 21 may be optionally provided having a High Definition Multimedia Interface (HDMI) socket or both USB and HDMI sockets. In addition to the in-flight entertainment system directly communicating with such personal electronic devices to access video and music content stored thereon, the USB ports can also be used for charging the internal battery of the devices. Additional modules may be provided as well or substituted for the one of the other modules 18 and 19, such as a module having an Ethernet socket or a DisplayPort input for example.

In order to select programs and otherwise interact with the in-flight entertainment unit, a remote controller 20 with particular input buttons is provided. Generally, the in-flight entertainment unit processes the user inputs on the remote controller 20, and the result of such operations are shown on the display screen 16. Although placing the display screen 16 on the seat back 14 is, for the most part, universal except for rows without a passenger seat 10 in front of it, the placement of the audio connectors or the audio jack module 18 and the remote controller 20 are not. In many aircraft configurations, these components are oftentimes placed on the armrest between each passenger seat 10. Accordingly, the configuration of the seat back 14 as shown in FIG. 1 is presented by way of example only and not of limitation.

There are several other components installed on the seat back 14 of the passenger seat 10. For instance, there may be a folding seat back tray 22 that is mounted to the passenger seat 10 with a pair of opposed arms. The tray 22 can be folded for stowage, with a latch 24 securing the same to the seat back 14 as shown for the outer passenger seat 10b. The seat back 14 may also include an expanding pouch 26 in which generally flat articles such as aircraft safety documentation, magazines, newspapers, passenger comfort items, and the like may be placed.

Again, various embodiments of the present disclosure are directed to an illumination module 28, which may also be referred to more specifically as a reading light, or more generally, as a lighting apparatus. When activated, the illumination module 28 is contemplated to generate a beam of light 29 that covers an area immediately in front of the seated passenger. As will be described in further detail below, a push button actuation is contemplated, where the passenger presses on the operative element of the illumination module 28 to turn on the light, and presses again to turn off the light. The illumination module 28, like the audio jack module 18 adjacent thereto, is mounted to the seat back 14. A common interior and external or passenger facing footprints, as well as a common mounting mechanism is contemplated for all of the modules that may be installed on the seat back 14. In this regard, the standardized modules are understood to be interchangeable with each other and may be reconfigured depending on the specific needs of the aircraft operator. Therefore, to the extent electrical interconnections are made from the modules to the in-flight entertainment system or to any other data network node on the aircraft, the physical links are likewise understood to be standardized.

Figure 2:
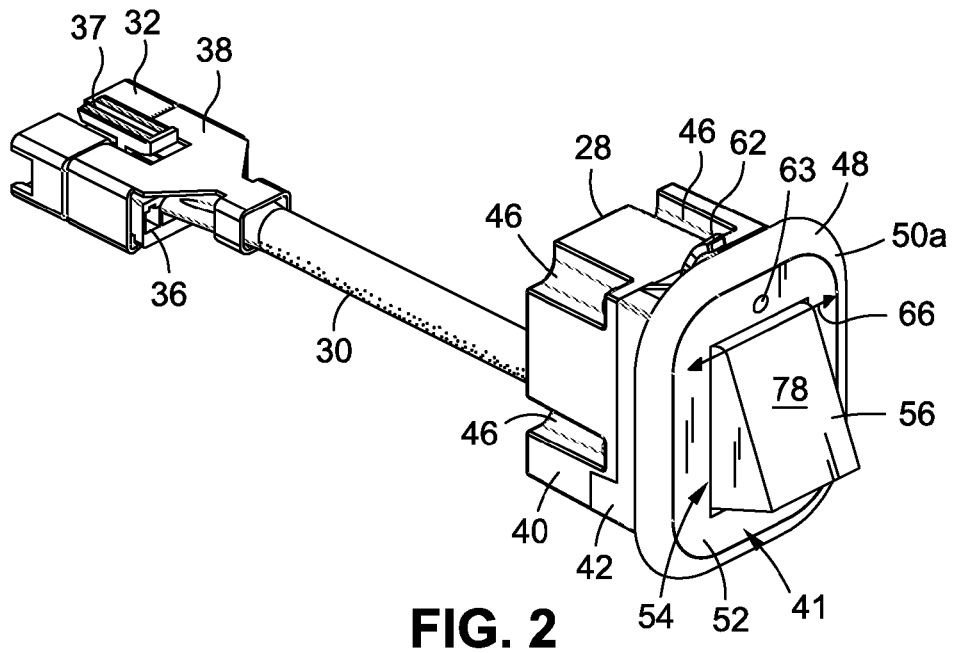
FIG. 2 is a detailed front perspective view of one embodiment of the illumination module.
Figure 3:
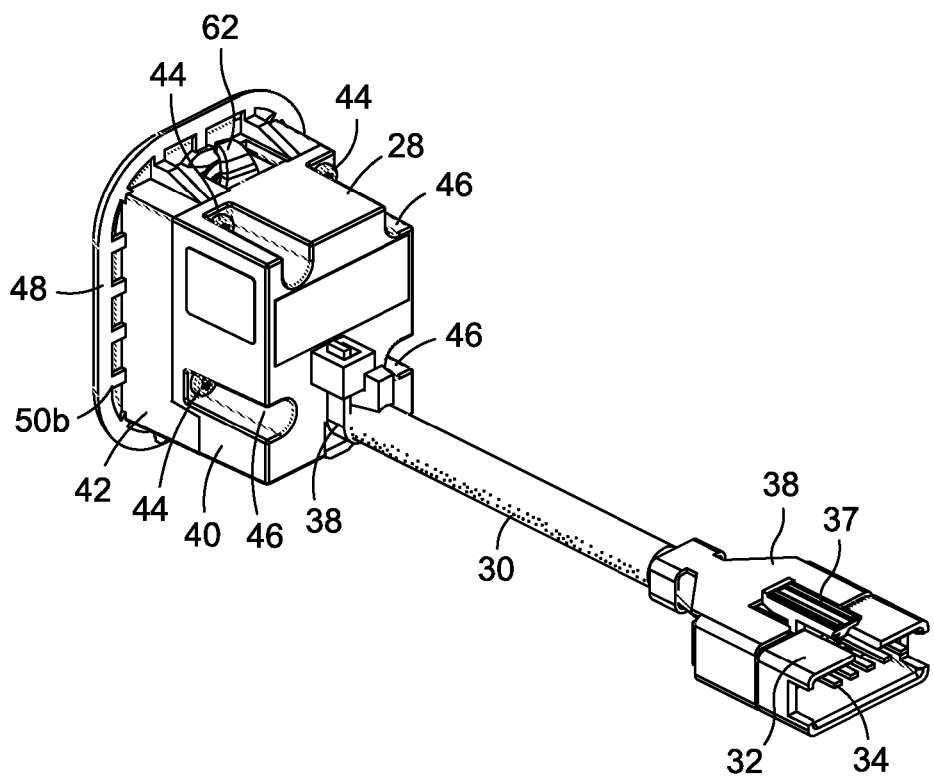
FIG. 3 is a detailed rear perspective view of the illumination module shown in FIG. 2.

Referring now to the front perspective view shown in FIG. 2 and the rear perspective view shown in FIG. 3, a cable 30 may electrically connect the illumination module 28 to another component. In the case of the illumination module 28, the sole interconnection needed may be to an electrical power source, though a connector socket 32 may include more than one pin 34 that remains unused. Each of the pins 34 may be connected to a terminal block 36 within the connector socket 32, which in turn is connected to one or more individual lines within the cable 30. There is understood to be a corresponding terminal block (not shown) in the illumination module 28 that distributes the incoming lines in the cable 30 to appropriate circuitry. The connector socket 32 is receptive to a correspondingly configured connector plug that may be, in turn, connected to a signal source over another length of multi-line cabling. There may also be a retention tab 37 that engages a corresponding groove defined in the connector plug.

It is typical for the cable 30 to be routed through extremely confined spaces within the interior of the passenger seat 10 and other parts of the aircraft, and so it may be bent and subject to all manners of outside forces. To prevent fraying and other damage to the cable 30, a strain relief 38 may be provided at each end.

Although a multi-pin connector socket 32 along with a multi-line cable 30 are shown in connection with the illustrated example of FIGS. 2 and 3, if a single power connection is all that is needed, these components may be replaced with single pin/single line variations without departing from the present disclosure. However, it may also be advantageous for the illumination module 28 to provide additional data to the in-flight entertainment system and/or other data processing systems of the aircraft, such as whether or not the illumination module 28 is activated. Where there are other signal sources of the illumination module 28, the illustrated multi-pin connector socket 32 and the multi-line cable 30 may continue to be applicable to such alternative embodiments.

The illumination module 28 is generally defined by a housing 40 or base enclosure that has a hollow interior and an open front face 41. There is also an enclosure cap 42 that is attached to the housing 40 and covers the open front face 41. This attachment may be further secured with fasteners or screws 44 positioned around the periphery of the housing 40. Access to these fasteners is possible through tool access slots 46 defined by the housing 40. The enclosure cap 42 further includes a peripheral bezel 48 having a forward surface 50*a* and an opposed rear surface 50*b*. As will be described in further detail below, the rear surface 50*b* abuts against the vehicle mounting structure.

Either integral to or separate from the enclosure cap 42 is a face plate 52 that is substantially flush with the outermost portion of the peripheral bezel 48. The face plate 52 defines an opening 54 through which a switch member 56 partially protrudes as shown in FIG. 2. The switch member 56 may be variously referred to as a switch actuator or a pivot assembly. In the context of the disclosed embodiments, these terms may refer to the same feature or structure, but some terms may be more appropriate in the context of some embodiments than others, and it is intended for the present disclosure to encompass all such variations.

Figure 4:
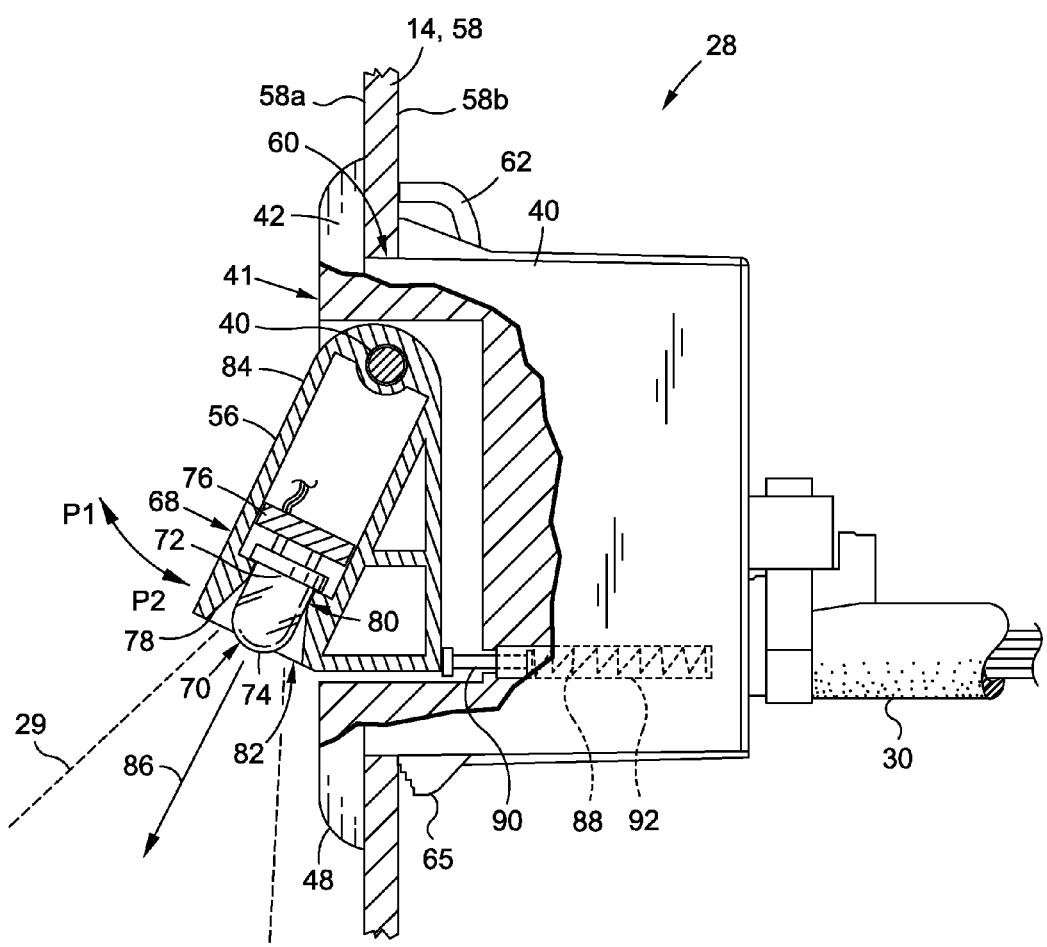
FIG. 4 is a cross-sectional side view of a first variant of the illumination module in which an activatable switch member remains protruding from the faceplate in both an off position and an on position.

FIG. 4 illustrates a typical installation of the illumination module 28 on the seat back 14. In further detail, the seat back 14, that is, the vehicle interior structure is generally defined by a panel 58 having an exterior side 58*a* and an opposed interior side 58*b*. Through a cutout or opening 60, the housing 40 is inserted and secured against the interior side 58*b* of the panel 58. The opening 60 is understood to have an outline that corresponds to at least a segment of the front face 41 of the housing 40 so that it may be fitted through the opening 60. The housing 40 includes a projection 62 abutting against the interior side 58*b* of the panel 58, to counter the opposing force imparted by securing the enclosure cap 42 to the housing 40 and against the exterior side 58*a* of the panel 58. Referring to FIG. 2, a screw or bolt in opening 63 is tightened to draw the projection 62 snugly against the interior side 58*b* of the panel (see FIG. 4), while simultaneously drawing the peripheral bezel 48 of the illumination module 28 against the exterior side of the panel 58*a*. A pair of bottom projections 65 holds the bottom portion of the illumination module 28 to the panel 58.

As shown in FIG. 2, for installation of the module 28, the connector socket 32 is first connected to a mating socket in the vehicle through the opening 60 in the panel 58, which is illustrated in FIG. 4. With continued reference to FIG. 4, the housing 40 is next inserted rearward into the opening 60 until the peripheral bezel 48 abuts the exterior side 58*a* of the panel 58 and the top projection 62 and bottom projections 65 have slid over the edges of the opening 60. Thereafter the fastener in opening 60 is tightened to securely sandwich the panel 58 between the peripheral bezel 48 and the top projection 62. Referring to FIG. 1, the other modules 18, 19, and 21 are all attached in substantially the same manner and the locations of the modules 18, 19, 21, and 28 may be interchanged with one another according to preference.

The housing 40 and enclosure cap 42 are preferably formed of a plastic material, and more preferably a thermoplastic, such as polyethylene (PE), polypropylene (PP), or acrylonitrile butadiene styrene (ABS), for example, or a thermoplastic formed from a mixture or alloy of polyvinyl chloride (PVC) and an acrylic and is fire retardant. For aviation applications in particular, the material should meet flammability and other requirements imposed by the appropriate authorities, such as the Federal Aviation Administration (FAA) in the US and the European Aviation Safety Agency (EASA) in Europe, or the controlling authority of the applicable country. Suitable material for the housing 40 and enclosure cap 42 is commercially available from Boltaron Inc. of Newcomerstown, Ohio, USA, including material meeting requirements for the aviation industry.

Returning to FIG. 1, as can be seen, the audio module 18, USB module 19, and illumination module 28 are of the same size with respect to the opening in the panel 58 in FIG. 4. This permits the modules 18, 19, 21, 28 and others types of modules to be substituted for one another according to a desired vehicle configuration or future developments. For example, the HDMI module 21 could be replaced with a module for providing wireless connectivity, such as WHDI (Wireless Home Digital Interface) or WirelessHD, which is based on a 7 GHz channel in the 60 GHz Extremely High Frequency Band for receiving video and audio from a personal electronic device. Another alternative is to replace the HDMI module 21 with a USB module having sockets of a different size, e.g., mini USB and/or micro USB sockets. As yet another alternative, the HDMI module 21 could be replaced with a switch module for controlling the illumination module 28, i.e., switching the illumination module 28 off and on, rather than incorporating a switch into the illumination module and simplifying the illumination module. Producing the modules 18, 19, 21, and 28 enables cost reductions and flexibility in providing different configurations, especially as standards change and some become more common or less common or as new connections standards are introduced to allow for upgrading of IFE systems.

Referring to both FIG. 3 and FIG. 4, the switch member 56 is pivotally or otherwise engaged to the housing 40, and as indicated above, partially protrudes therefrom. Although various configurations are possible, in the example shown, there is a horizontal axle 64 that extends from opposing sides of the housing 40. The horizontal axle 64 has a central axis that is coaxial with a horizontal pivoting axis 66. According to various embodiments, the switch member 56 has a first position P1 and a second position P2 along a radius of rotation about the horizontal pivoting axis 66. That is, the protruding part of the switch member 56 can be pressed in and out of the interior of the housing 40, and is thus in a vertically rotating engagement therewith.

The illumination module 28 further incorporates an illumination assembly 68 that is generally defined by an output end 70 that projects the aforementioned light 29. The illumination assembly 68 includes an illumination source 72, which by way of example only and not of limitation, is a light emitting diode (LED) device. Employing LEDs is understood to reduce power consumption for the same or higher light output, and is therefore more efficient. In the depicted example, a conventional through-hole package with an integrated plastic lens 74 is utilized and mounted to a circuit board 76, though it will be recognized by those having ordinary skill in the art that any other alternative LED packaging may be substituted without departing from the present disclosure. For instance, a surface mount package may be mounted to the circuit board 76 instead. As with all electronic devices, the illumination source 72 has an activated or energized state in which electrical current flows through its terminals, and a deactivated state in which there is not. In addition to such binary operation, the light output may be dimmed utilizing known pulse width modulation techniques as well as analog current attenuation techniques. The controls for such dimming function may be incorporated into the switch member 56 in accordance with different configurations known in the art.

Regardless of the packaging modality, the illumination assembly 68 is understood to incorporate a reflector 78 that directs the light 29 toward the output end 70. The reflector 78 is understood to have a conical configuration with an open apex 80 and an open base 82, with the illumination source 72 being disposed within the open apex 80. Further, the focusing lens is proximal to the open base 82.

The output end 70 of the illumination assembly 68 is proximal to a section of the switch member 56 that protrudes from the housing 40 according to various embodiments. In further detail, the switch member 56 is defined by a flat planar surface 84 that is generally oblique, or at least positioned to be oblique, to the front face 41 of the housing 40. In the embodiment of FIG. 4, the flat planar surface 84 is oblique to the front face 41 regardless of being in the first position P1 or the second position P2, as a retraction mechanism is not contemplated therefor. However, as will be detailed below, there are other embodiments where the flat planar surface 84 can be positioned or actuated to be substantially parallel to the front face 41.

The illumination assembly 68, or at least the output end 70 thereof, is mounted in a first orientation that projects the light 29 along an emission axis 86 that is substantially normal, or perpendicular to the horizontal pivoting axis 66 of the switch member 56. Furthermore, as also shown in FIG. 1, the light 29 is projected rearward and away from the passenger seat back 14. In other words, the output end 70 of the illumination assembly 68 projects the light 29 outwardly from the horizontal pivoting axis 66. Some level of dispersion is understood to occur as a result of the particular configuration of the lens 74, however.

Figure 5:
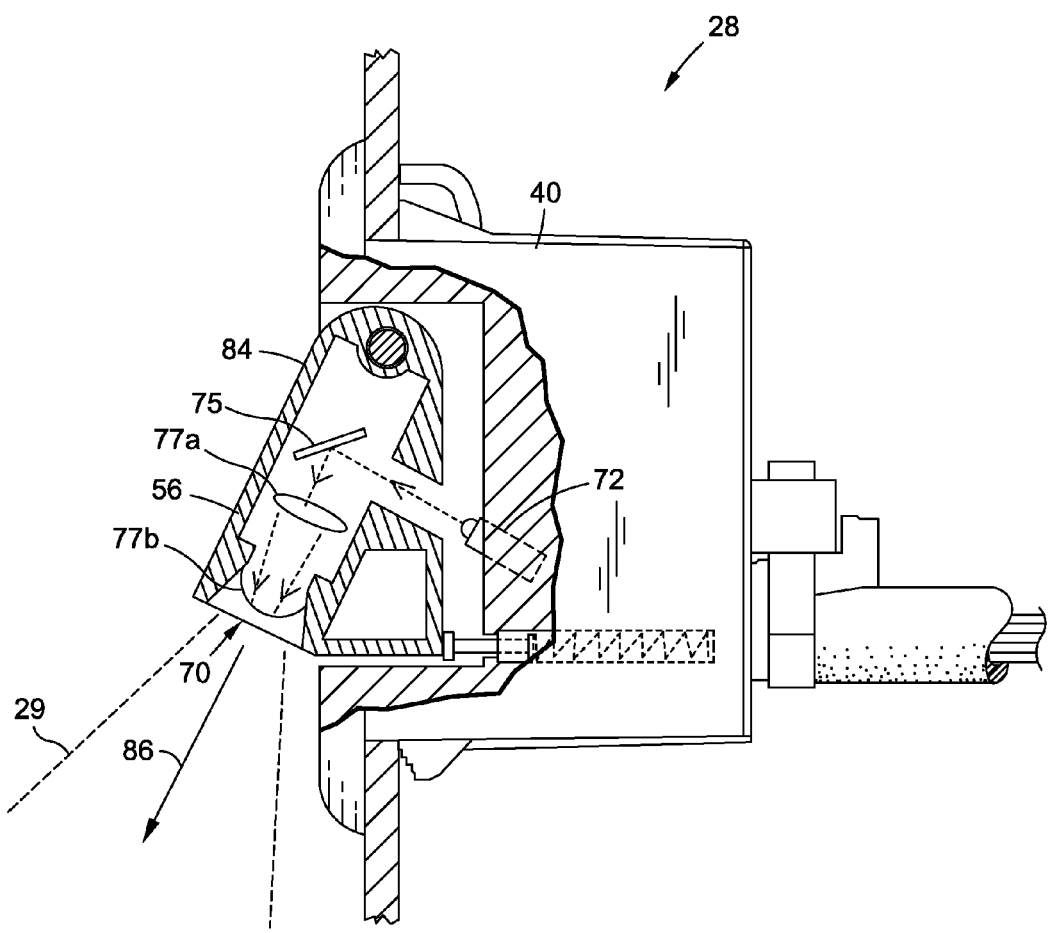
FIG. 5 is a side cross-sectional view of the illumination module in which an illumination source is disposed within the housing instead of on the activatable switch member.

The embodiment shown in FIG. 4 contemplates the entirety of the illumination assembly 68 being mounted to the switch member 56, though it is not limited thereto. As best illustrated in FIG. 5, a variation is also contemplated where the illumination source 72 is disposed on the housing 40 rather than directly on the switch member 56. A secondary reflector 75 is incorporated into the switch member 56, and redirects the light emitted from the illumination source 72 by a predetermined angle to be emitted from the output end 70 in the same aforementioned emission axis 86. Various focusing lenses 77a and 77b may also be utilized for producing a desired emission pattern or dispersion. It is therefore expressly contemplated that only a part of the illumination assembly 68 need be mounted to the switch member 56.

As indicated above, the illumination source 72 is switched on and off in accordance with the actuation of the switch member 56. More particularly, the switch member 56 is coupled or otherwise mechanically linked to an electrical switch 88 that is connected to the illumination source 72. The electrical switch 88 is operated by movement of the switch member 56 between the first position P1 and the second position P2 to selectively power the illumination source 72. In the exemplary embodiment shown in FIG. 4, a plunger 90 of the electrical switch 88 is linked to a connecting arm that is integral to or otherwise attached to the switch member 56. Thus, the illumination source 72 is transitioned between an illuminated state and a deactivated state in response to the actuation of the switch from an external force applied to the switch member 56.

According to one embodiment, the electrical switch 88 is of the alternate push configuration, in which the plunger 90 that reciprocates and alternatingly connects and disconnects the switch terminals that define an electrical circuit between the energy source and the illumination source 72. The electrical switch 88 itself may be incorporated with a biasing element 92 or spring that maintains the position of the plunger 90. External biasing elements are also possible for imparting an outward biasing force against the electrical switch 88 in opposition to input force against the switch member 56. A particular embodiment of the electrical switch 88 with a push button configuration has been shown and described, though this is by way of example only and not of limitation. Any other electrical switch 88 may be substituted, with those having ordinary skill in the art recognizing the suitable modifications to the switch member 56 and any other component in the illumination module 28 that adapt such alternative configurations to function in the same or similar manner as that which is described herein.

Figure 6:
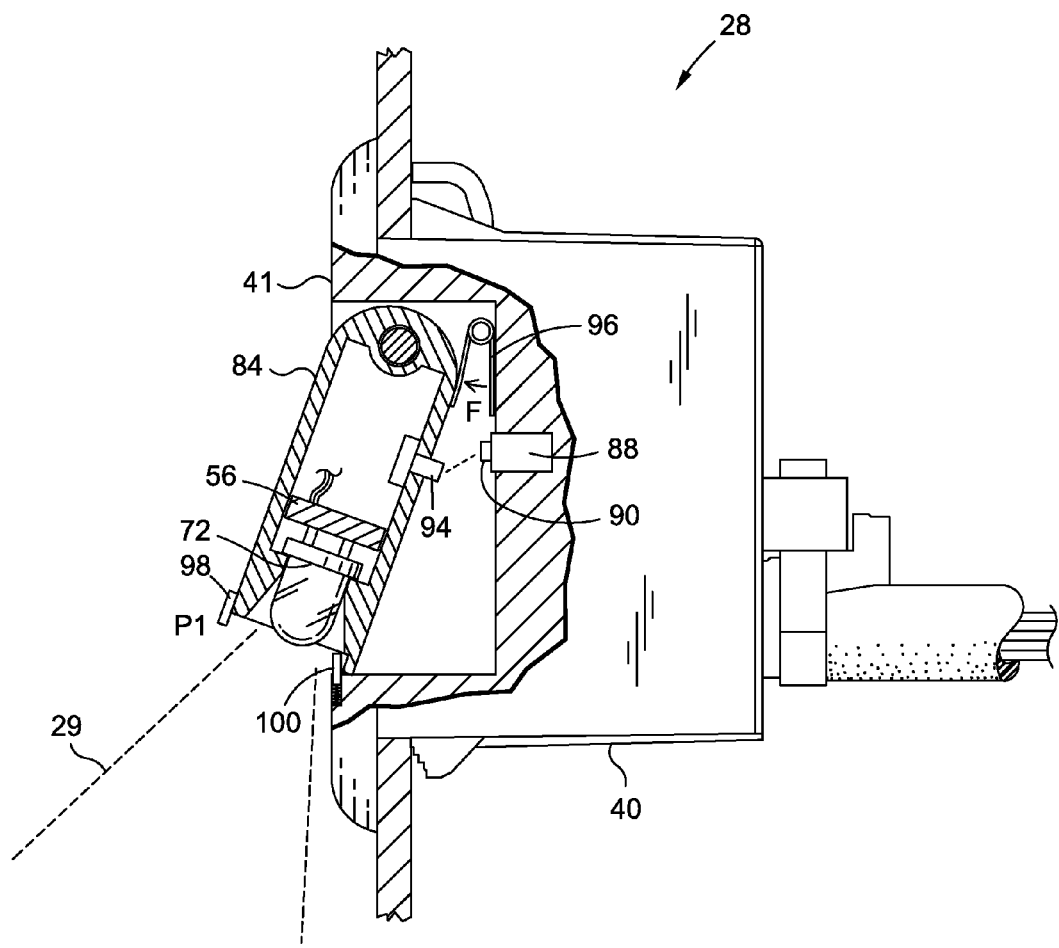
FIG. 6 is a cross-sectional side view of a second variation of the illumination module in which the activatable switch member is retractable.
Figure 7:
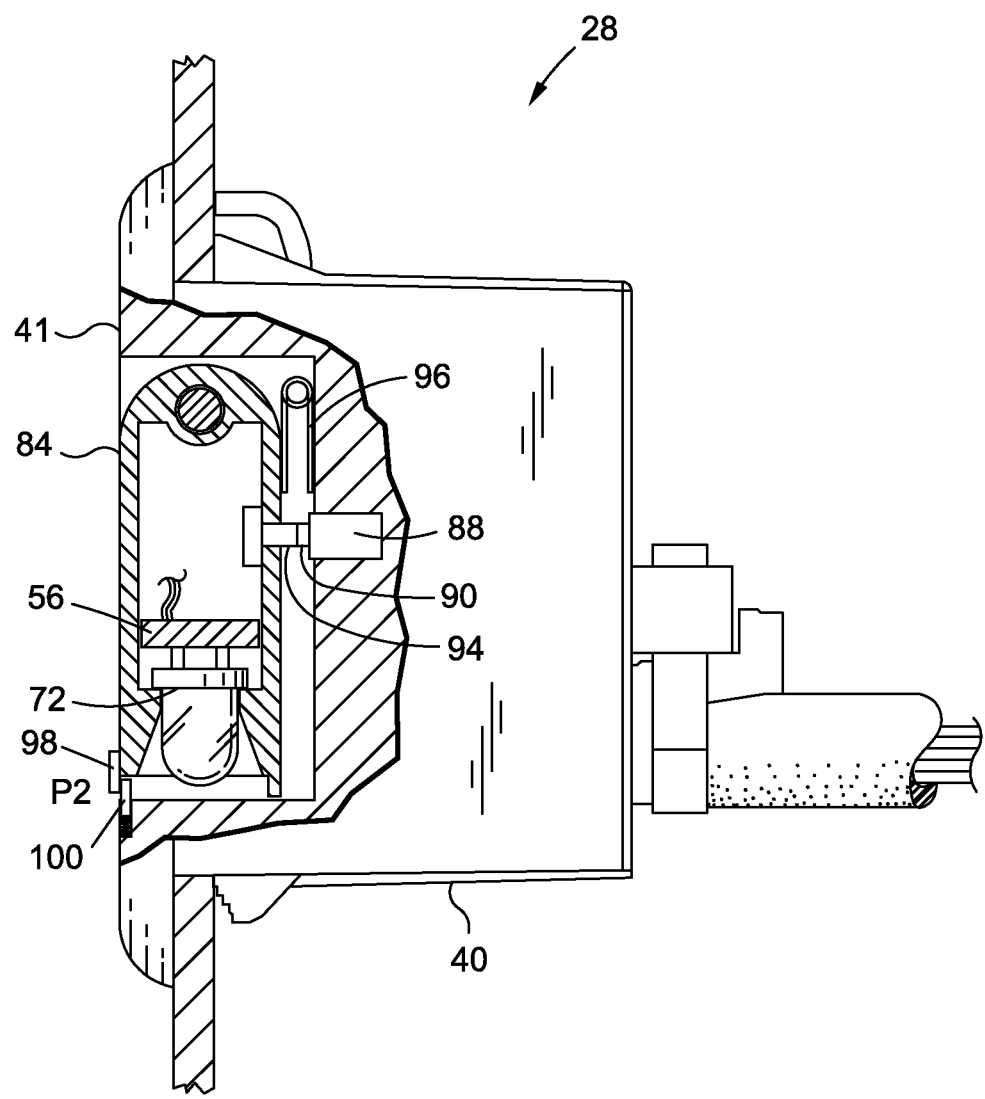
FIG. 7 is a cross-sectional side view of the second variant of the illumination module with the activatable switch member being shown flush with the faceplate in a retracted, off position.

Referring now to FIGS. 6 and 7, an alternative configuration in which the switch member 56 is retracted or stowed within the housing 40 is also contemplated. In the extended, activated state shown in FIG. 6, the flat planar surface 84 is oblique to the front face 41 of the housing 40. The switch member 56 rotates between the first position P1 shown in FIG. 6 and the second position P2 shown in FIG. 7. In this retracted state, the flat planar surface 84 is coplanar with the front face 41 of the housing 40.

By way of example only and not of limitation, the electrical switch 88 may have a different momentary push contact configuration to accommodate the stowage of the switch member 56. While in the stowed configuration, the illumination source 72 is understood to be switched off or otherwise deactivated. Instead of connecting the electrical circuit between the energy source and the illumination source 72 when actuated, the reverse functionality is envisioned. That is, when the electrical switch 88 is not actuated, e.g., the plunger 90 is not depressed, the illumination source 72 is turned on. When it is actuated, e.g., the plunger 90 is depressed because of the contact made between the protrusion 94 defined by the switch member 56, turning off the illumination source 72. Another biasing element 96 imparts an outward force in a direction f. In order to maintain the stowed state, the switch member 56 may include a spring-loaded tab 98 that cooperates with a corresponding latch 100 to secure the switch member 56. Different configurations from the illustrated locking mechanism will be readily recognized by those having ordinary skill in the art, and such variations are understood to be encompassed within the present disclosure.

Figure 8:
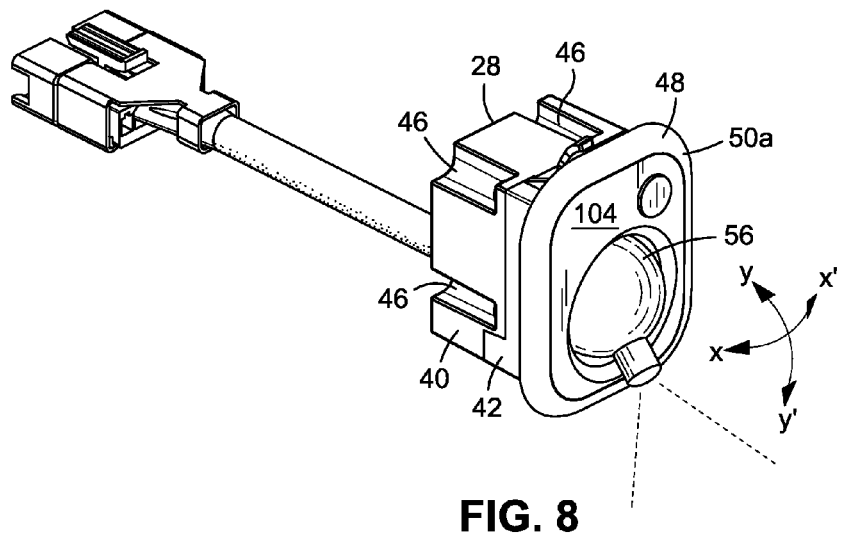
FIG. 8 detailed front perspective view of another embodiment of the illumination module having a ball-and-socket joint configuration.

Depicted in FIG. 8 is still another embodiment of the illumination module 28 that has a ball-and-socket joint configuration. The housing 40, the enclosure cap 42, and the peripheral bezel 48 have the same external configuration as discussed above in relation to the other embodiments, though the forward surface 50a is different. With additional reference to the cross-sectional view of FIG. 9, the housing 40 defines a socket recess structure 102 with a flat front face 104 that generally corresponds to the front face 41 of the housing 40. The socket recess structure 102 is further defined by a partially spherical socket 106 and a peripheral bevel 109 that encircles the opening of the partially spherical socket 106. In one embodiment, the illumination source 72 is further inset into a central slot 110 defined in the deepest portion of the partial spherical socket 106. In the illustrated example, the socket recess structure 102 and its constituent parts are depicted as an integral structure, though this is by way of example only and not of limitation.

Figure 9:
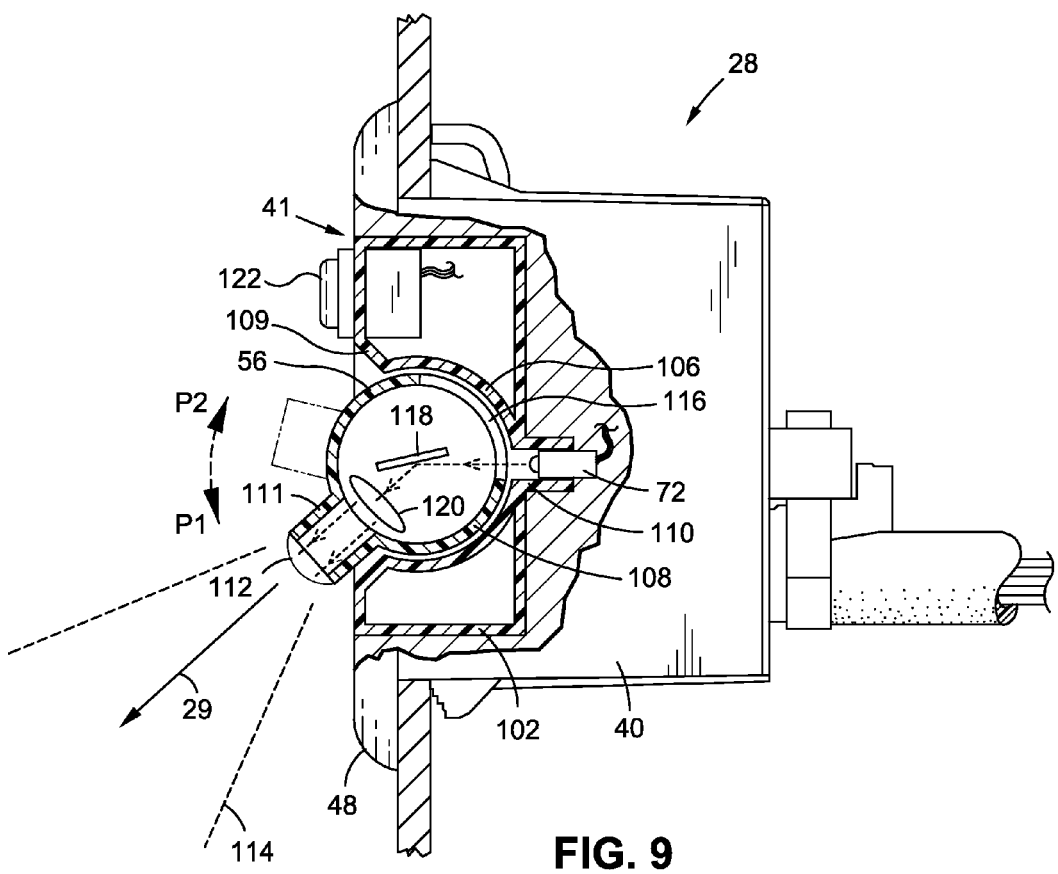
FIG. 9 is a side cross-sectional view of the illumination module shown in FIG. 8.

Received within the partially spherical socket 106 is a ball joint member 108 that is part of the switch member 56. The ball joint member 108 likewise has a spherical configuration that is sized and shaped to be rotatable inside the partially spherical socket 106. The switch member 56 of the illustrated embodiment includes a projection or nose portion 111. The rotational extent of the ball joint member 108, and hence the switch member 56, is understood to be limited by the nose portion 111, though it is freely rotatable along any section of the x-x' axis and the y-y' axis as shown. In other words, the ball joint member 108 rotates about an axis that is defined by a radial center of the ball joint member 108 and the partially spherical socket 106. With particular reference to FIG. 9, the nose portion 111 can thus be moved from a first position P1 vertically to a second position P2.

Generally, the beam of light 29 is projected from the nose portion 111, which at its distal end, includes a lens 112 that disperses the beam of light 29 over a widening pattern 114. The nose portion 111 is understood to be hollow, as is the ball joint member 108. An optical path from the illumination source 72 is partly defined by an opening 116 in the ball joint member 108, and is consistently reflected or refracted to the nose portion 111 with a mirror 118 regardless of the particular orientation of the ball joint member 108 relative to the partially spherical socket 106. The mirror 118, and a focusing lens 120, is disposed within the switch member 56. This configuration is envisioned for allowing the passenger to adjust the direction of light both vertically and from side to side.

The illumination source 72 may be activated and deactivated with a separate switch 122 that is accessible from the front face 41 of the housing 40. As with the other embodiments disclosed herein, any type of switch may be provided for the illumination module 28, including mechanical and touch type switches. Mechanical type switches are advantageous in that they generally provide tactile and/or audible feedback to a user, e.g., the user feels some movement as the switch is activated and/or hears a click. Touch type switches may be capacitive, resistance, piezo, membrane, or other type. Touch switches have an advantage in that they are long lasting. Tactile feedback for touch switches may be provided by including a vibrator for producing a slight vibration when the switch is activated and possibly an audio sound as well and an indicator or back light for the switch to indicate when it is activated. An indicator or backlight maybe provided for mechanical switches as well. Suitable touch switches are commercially available from a variety of suppliers, for example, from Atmel Corporation of San Jose, Calif.

Figure 10:
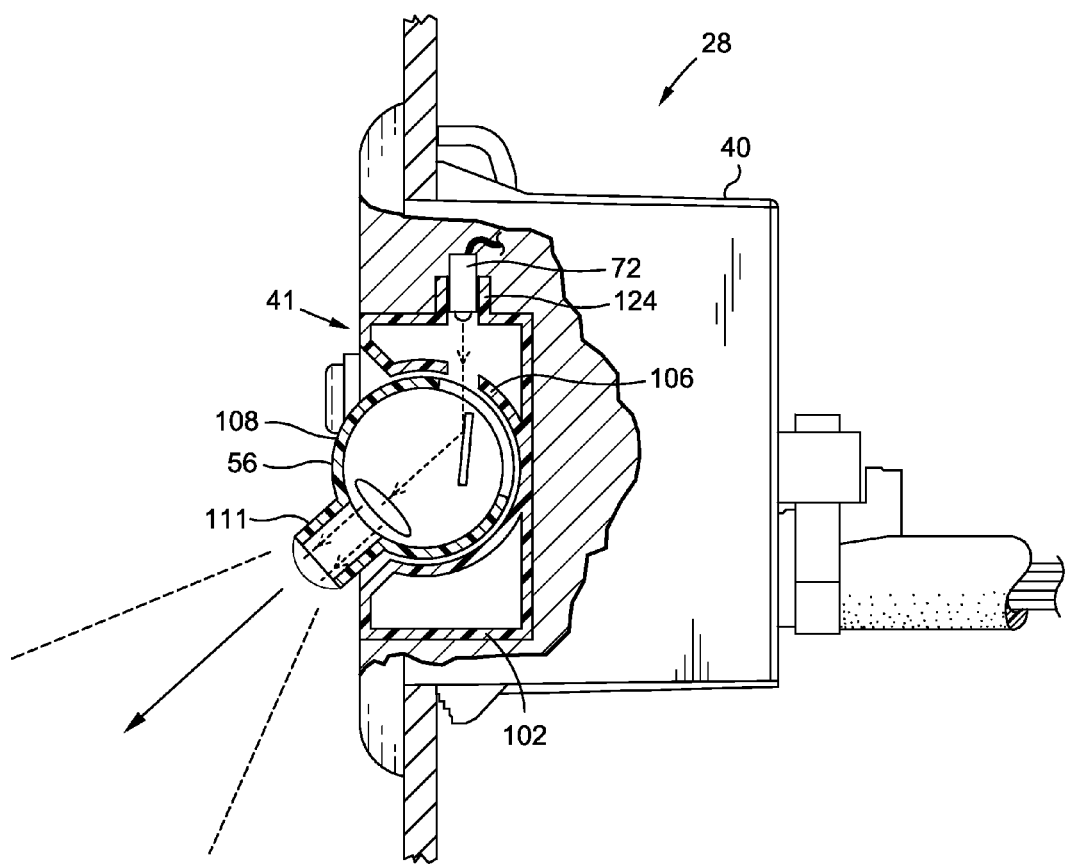
FIG. 10 is a side cross-sectional view of the illumination module shown in FIG. 8 and FIG. 9, with an alternative positioning of an illumination source.

An alternative embodiment of the socket recess structure 102 is shown in FIG. 10. The illumination source 72 is inset into an upper slot 124 such that an initial light beam is projected downwardly, or at least in an axis parallel to the front face 41 of the housing 40. The mirror 118 is likewise disposed within the ball joint member 108, along with the focusing lens 120. In all other respects, this embodiment is the same as that described above with reference to FIG. 9; the positioning of the illumination source 72 has been modified.

Figure 11:
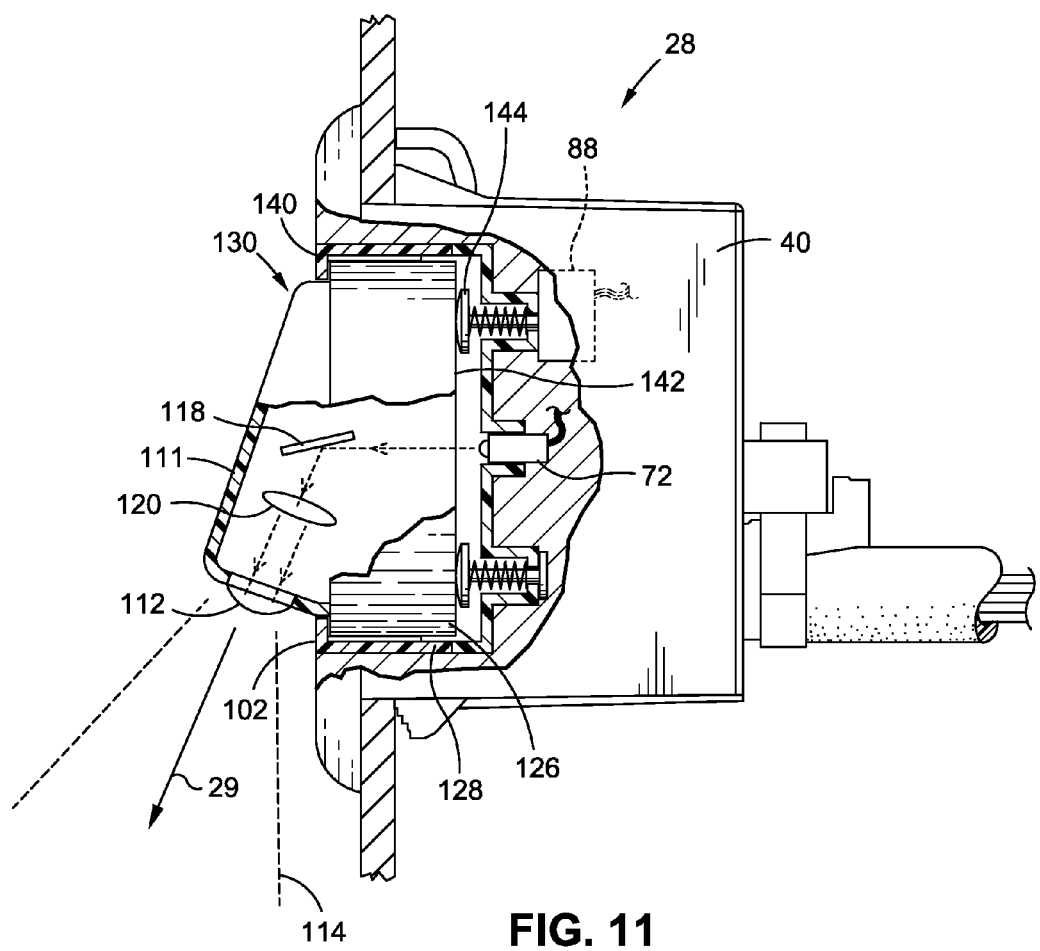
FIG. 11 is a side cross-sectional view of yet another embodiment of the illumination module with a rotating activatable switch member.
Figure 12:
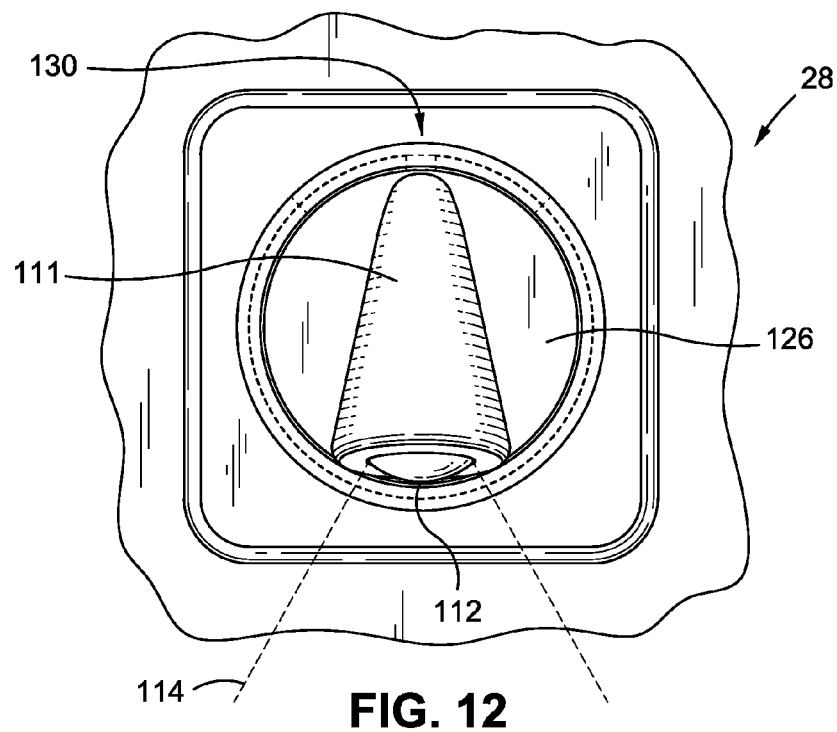
FIG. 12 is a front view of the illumination module with the rotating activatable switch member in a first orientation.
Figure 13:
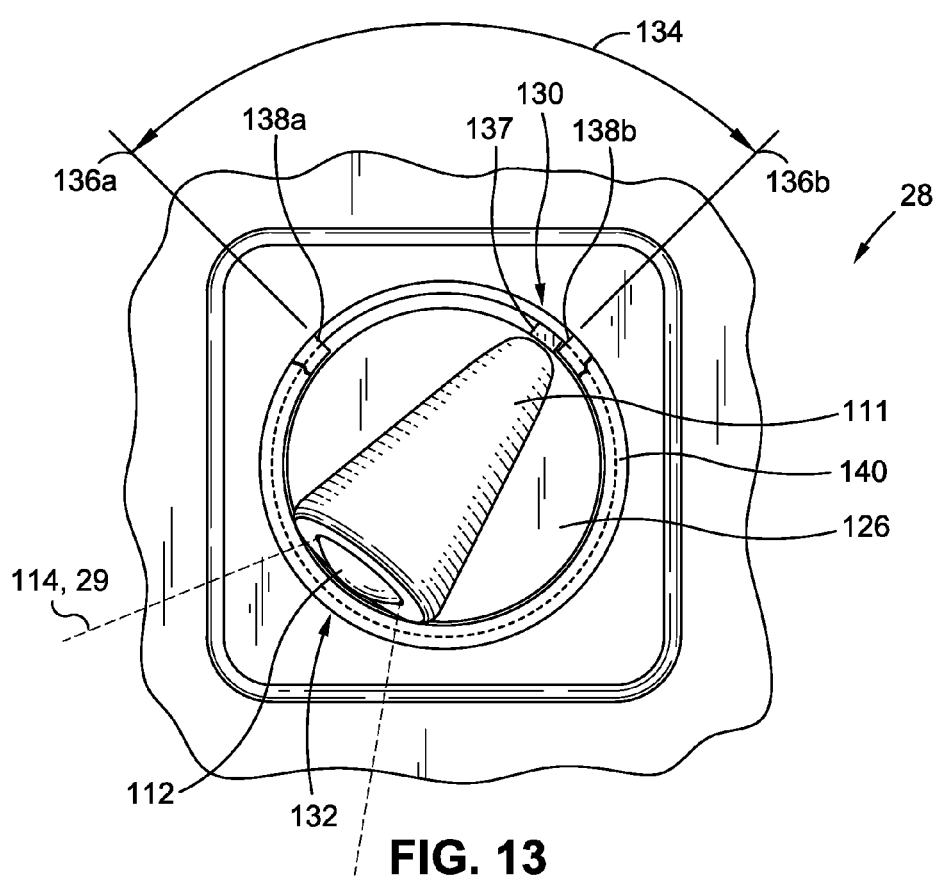
FIG. 13 is a front view of the illumination module shown in FIG. 12 with the rotating activatable switch member in a second orientation.

Referring now to FIGS. 11-13, yet another embodiment of the illumination module 28 contemplates an alternative switch member 56 having a cylindrical portion 126 that is rotatable within a correspondingly sized and shaped cylindrical socket 128 that is part of the socket recess structure 102. The housing 40 is mounted to the vehicle seatback 14 in the same manner as discussed above in relation to the other embodiments of the illumination module. The switch member 56 includes a projection or nose portion 111 that is structurally integral with the cylindrical portion 126. FIGS. 12 and 13 depict the nose portion 111 having a conical configuration defined by an apex end 130 and an opposed base end 132 from which the light 29 projects. However, it will be appreciated by those having ordinary skill in the art that this is by way of example only and not of limitation. The projection or nose portion 111 is understood to serve as a knob or otherwise function as feature that can be manually grasped to rotate the switch member 56. Any other suitable configuration that achieves this may be readily substituted without departing from the present disclosure.

As shown in FIG. 13 in particular, the switch member 56 rotates along an axis 134 and retained in any orientation between a left rotation extremity 136a and a right rotation extremity 136b. The cylindrical portion 126 may include a stop tab 137 that can abut against respective shoulder 138a, 138b of a circular bezel 140 at is rotation extremities 136a, 13b, thereby preventing the switch member 56 from being rotated any further. This is envisioned to prevent the passenger from directing the light 29 to neighboring passengers. The circular bezel 140 may be defined by the socket recess structure 102.

The base end 132 includes the lens 112, by which the light from the illumination source 72 is dispersed as the widening pattern 114. In addition to the lens 112, the switch member 56 may include the focusing lens 120 and the mirror 118. The illumination source 72 is aligned with the mirror 118 such that the light emitted therefrom is reflected or refracted towards the base end 132 of the nose portion.

The switch member 56 also reciprocates within the cylindrical socket 128. The thickness of the cylindrical portion 126 of the switch member 56 is such that a slight clearance is defined between the bottom of the cylindrical socket 128 and a bottom surface 142 of the cylindrical portion 126. There are one or more spring-loaded plungers 144 that are biased against the bottom surface 142, with one being connected to the electrical switch 88. The biasing force against the bottom surface 142 of the switch member 56 is understood to press the same against the circular bezel 140. That is, the circular bezel 140 retains the switch member 56 within the socket recess structure 102. Accordingly, by pressing the switch member 56 inwards, the illumination source 72 may be activated and deactivated in a similar manner as described above in relation to the other embodiments.

The particulars shown herein are by way of example and for purposes of illustrative discussion of the various embodiments of the illumination module only and are presented in the cause of providing of what is believed to be the most useful and readily understood description of the principles and conceptual aspects thereof. In this regard, no attempt is made to show more details than are necessary for a fundamental understanding of the disclosure, the description taken with the drawings making apparent to those skilled in the art how the several forms of the presently disclosed illumination module may be embodied in practice.

What is claimed is:

1. An illumination module for mounting to a vehicle interior structure, the illumination module comprising:
    a housing defined by an interior and a partially open front face;
    a switch member engaged with the housing and at least partially protruding from the front face thereof, the switch member having at least a first position and a second position;
    an illumination assembly defined by an output end and including an illumination source, a primary reflector disposed within the housing, a secondary reflector mounted to the switch member, and a focusing lens corresponding to the output end, at least a part of the illumination assembly being mounted to the switch member with the output end being proximal to a section of the switch member protruding from the front face of the housing; and
    an electrical switch connected to the illumination source and operated by movement of the switch member between the first position and the second position to selectively power the illumination source.

2. The illumination module of claim 1, wherein the electrical switch has an alternate push configuration including a plunger actuator coupled to the switch member.

3. The illumination module of claim 1, wherein the illumination assembly includes a reflector and a focusing lens corresponding to the output end.

4. The illumination module of claim 1, wherein:
the switch member reciprocates within the housing between the first position and the second position; and
the switch member rotates within the housing.

5. The illumination module of claim 1, wherein the illumination source is a light emitting diode.

6. The illumination module of claim 1, wherein:
the vehicle interior structure is defined by a panel with an interior side and an opposed exterior side, the panel further defining an opening having an outline corresponding to at least a segment of the front face of the housing; and
the housing is mounted against the panel.

7. A reading light for a passenger seat back, the reading light comprising:
a base enclosure mounted to the passenger seat back;
a switch actuator in a vertically rotating engagement with the base enclosure about a horizontal rotation axis;
a lamp unit mounted to the switch actuator in a first orientation to project light along an emission axis substantially normal to the horizontal rotation axis of the switch actuator and extending rearward and away from the passenger seat back; and
an alternate push electrical switch coupled to the switch actuator and electrically connected to the lamp unit;
wherein actuations of the alternate push electrical switch with the switch actuator correspondingly activates and deactivates the lamp unit, and the lamp unit, retracts into the housing when the alternate push electrical switch electrically disconnects the lamp unit from a power source.

8. The reading light of claim 7, further comprising:
a peripheral bezel coupled to the base enclosure and the passenger seat back;
wherein the passenger seat back is defined by an inner side with the base enclosure being attached thereto, and an opposed outer side with the peripheral bezel being attached thereto.

9. The reading light of claim 7, wherein the switch actuator is retractable into the base enclosure.

10. The reading light of claim 7, wherein the lamp unit includes a focusing lens, a reflector, and a lamp.

11. The reading light of claim 10, wherein the lamp is a light emitting diode.

12. The reading light of claim 7, further comprising:
a spring member imparting an outward biasing force against the switch actuator in opposition to the actuations thereof.

13. An illumination module for mounting to an interior structure in a vehicle, the vehicle having a panel with a plurality of openings into which at least one other kind of module is mountable in one of the openings, the illumination module comprising:
a housing including an interior;
an illumination source disposed in the housing; and
a switch including first and second states, the switch electrically connecting the illumination source to an energy source when the switch is actuated to one state and electrically disconnecting the illumination source from the energy source when the switch is actuated to the other one of the first and second states, the illumination source emitting light through the housing when connected to the energy source by the switch;
wherein the housing is insertable into another of the openings and into said one of the openings such that there is interchangeability with the other kind of module, and the illumination source retracts into the housing when the switch electrically disconnects the illumination source from the energy source.

14. The illumination module of claim 13, wherein the switch comprises a touch type.

15. The illumination module of claim 13, wherein the other kind of module is a mechanical switch module and supports said switch.

16. The illumination module of claim 13, wherein the housing includes top and bottom projections and a bezel in which the top and bottom projections sandwich the interior structure of the vehicle therebetween when the housing is inserted into one of the openings.

17. The illumination module of claim 13, wherein the illumination source at least partially projects from the housing when the switch electrically connects the illumination source to the energy source.

18. The illumination module of claim 13, further comprising:
an adjustable illumination output member engaged to the housing and defining an illumination output in optical communication with the illumination source;
wherein the adjustable illumination output member defines a ball and the housing defines a socket that cooperatively engages the switch member.

* * * * *